US010883378B2

(12) United States Patent
Kubota

(10) Patent No.: US 10,883,378 B2
(45) Date of Patent: Jan. 5, 2021

(54) COMBINED CYCLE PLANT AND METHOD FOR CONTROLLING OPERATION OF COMBINE CYCLE PLANT

(71) Applicant: Mitsubishi Hitachi Power Systems, Ltd., Kanagawa (JP)

(72) Inventor: Atsushi Kubota, Kanagawa (JP)

(73) Assignee: MITSUBISHI POWER, LTD., Kanagawa (JP)

( * ) Notice: Subject to any disclaimer, the term of this patent is extended or adjusted under 35 U.S.C. 154(b) by 336 days.

(21) Appl. No.: 15/767,863

(22) PCT Filed: Sep. 14, 2016

(86) PCT No.: PCT/JP2016/077141
§ 371 (c)(1),
(2) Date: Apr. 12, 2018

(87) PCT Pub. No.: WO2017/073195
PCT Pub. Date: May 4, 2017

(65) Prior Publication Data
US 2018/0298779 A1    Oct. 18, 2018

(30) Foreign Application Priority Data

Oct. 29, 2015 (JP) ................... 2015-213101

(51) Int. Cl.
*F01D 17/04*    (2006.01)
*F01K 23/10*    (2006.01)
(Continued)

(52) U.S. Cl.
CPC ............ *F01D 17/04* (2013.01); *F01K 9/003* (2013.01); *F01K 9/02* (2013.01); *F01K 23/101* (2013.01);
(Continued)

(58) Field of Classification Search
CPC ... F01D 17/04; F02C 9/28; F01K 9/02; F01K 23/101
See application file for complete search history.

(56) References Cited

U.S. PATENT DOCUMENTS 9,882,453 B2    1/2018 Schlesier et al.
10,196,942 B2 *  2/2019 Matsumoto ............. F01D 25/10
(Continued)

FOREIGN PATENT DOCUMENTS

EP    2 770 171    8/2014
EP    2 770 172    8/2014
(Continued)

OTHER PUBLICATIONS

JP-2000297610-A English Translation (Year: 1999).*
(Continued)

*Primary Examiner* — Shafiq Mian
(74) *Attorney, Agent, or Firm* — Wenderoth, Lind & Ponack, L.L.P.

(57) ABSTRACT

A gas turbine combined cycle (GTCC) power generation plant (100) equipped with a control unit which performs a load reduction following operation with respect to a fuel adjustment valve (Vd), a main steam valve (V1), and a bypass valve (V4), wherein, when a load reduction request for reducing a GTCC load target value has been input in a closed bypass operation, the degree of opening of the fuel adjustment valve (Vd) is reduced in accordance with the target value while the main steam valve (V1) is in an open state, and the bypass valve (V4) is placed in an open state, after which the bypass valve (V4) is placed in the closed state when the GTCC load reaches the target value.

15 Claims, 9 Drawing Sheets

(51) Int. Cl.
  *F02C 6/18* (2006.01)
  *F02C 9/52* (2006.01)
  *F01K 9/00* (2006.01)
  *F01K 9/02* (2006.01)
  *F02C 9/28* (2006.01)
  *F22B 1/18* (2006.01)

(52) U.S. Cl.
  CPC .................. *F02C 6/18* (2013.01); *F02C 9/28* (2013.01); *F02C 9/52* (2013.01); *F05D 2270/053* (2013.01); *F05D 2270/13* (2013.01); *F05D 2270/335* (2013.01); *F22B 1/1815* (2013.01); *Y02E 20/16* (2013.01)

(56) References Cited

U.S. PATENT DOCUMENTS

| | | | | |
|---|---|---|---|---|
| 10,450,900 | B2* | 10/2019 | Iida | F01K 23/101 |
| 2005/0022497 | A1* | 2/2005 | Takai | F01K 23/16 |
| | | | | 60/39.182 |
| 2012/0210713 | A1 | 8/2012 | Ernst et al. | |
| 2015/0107218 | A1* | 4/2015 | Nakamura | F01K 13/02 |
| | | | | 60/39.182 |
| 2015/0125260 | A1* | 5/2015 | Kashima | F01D 25/12 |
| | | | | 415/1 |
| 2015/0285141 | A1* | 10/2015 | Manabe | F02O 6/18 |
| | | | | 60/774 |

FOREIGN PATENT DOCUMENTS

| | | |
|---|---|---|
| JP | 63-87202 | 6/1988 |
| JP | 7-103405 | 4/1995 |
| JP | 2000-297610 | 10/2000 |
| JP | 2000-303804 | 10/2000 |
| JP | 2000297610 A * | 10/2000 |
| JP | 2014-163378 | 9/2014 |
| WO | 2015-143280 | 9/2015 |
| WO | 2015/147143 | 10/2015 |

OTHER PUBLICATIONS

Office Action dated Apr. 30, 2019 in Chinese Patent Application No. 201680059017.1, with English-language translation.
Extended European Search Report dated Jul. 27, 2018 in European Application No. 16859432.3.
International Search Report dated Nov. 1, 2016 in International (PCT) Application No. PCT/JP2016/077141, with English Translation.
Written Opinion of the International Searching Authority dated Nov. 1, 2016 in International (PCT) Application No. PCT/JP2016/077141, with English Translation.

* cited by examiner

COMBINED CYCLE PLANT AND METHOD FOR CONTROLLING OPERATION OF COMBINE CYCLE PLANT

TECHNICAL FIELD

The present invention relates to a combined cycle plant and a method for controlling an operation of a combined cycle plant.

BACKGROUND ART

A gas turbine combined cycle (GTCC) power plant includes a gas turbine, a heat recovery steam generator which generates steam by recovering heat of exhaust gas discharged from a gas turbine, and a steam turbine rotated by the steam generated by the heat recovery steam generator (for example, refer to Japanese Unexamined Utility Model Registration Application Publication No. 63-87202). In the GTCC power plant, for example, the generator is driven by the rotation of the gas turbine and the steam turbine so that rotational energy is converted into electric energy.

SUMMARY OF INVENTION

Technical Problem

In the GTCC power plant, in a case where a load of the overall plant fluctuates, a load of the gas turbine fluctuates. Following the fluctuations, a load of the steam turbine fluctuates. In other words, if the load of the gas turbine fluctuates, a flow rate and temperature of the exhaust gas fluctuate. Accordingly, an exhaust heat rate of the exhaust gas fluctuates. If the exhaust heat rate fluctuates, the amount of the steam generated by the heat recovery steam generator fluctuates. If the steam generation amount fluctuates, the amount of the steam flowing into the steam turbine fluctuates. Accordingly, the load of the steam turbine fluctuates. As a result, the load of the overall plant fluctuates. Therefore, compared to load followability of the gas turbine following overall load fluctuations, the GTCC power plant has poor load followability of the steam turbine.

The present invention is made in view of the above-described circumstances, and an object thereof is to provide a combined cycle plant and a method for controlling an operation of a combined cycle plant which can improve followability of a steam turbine following overall load fluctuations.

Solution to Problem

According to the present invention, there is provided a combined cycle plant including a gas turbine that has a compressor which compresses air, a combustor to which fuel is supplied from a fuel supply line so as to combust the air compressed by the compressor, and a turbine which is rotated using combustion gas generated by the combustor, and in which a fuel regulating valve for regulating a fuel supply amount is disposed in the fuel supply line, a heat recovery steam generator that generates steam by recovering heat of exhaust gas discharged from the gas turbine, a steam turbine that is rotated using the steam generated by the heat recovery steam generator, a main steam line that supplies the steam generated by the heat recovery steam generator to the steam turbine, a main steam valve that is disposed in the main steam line so as to regulate a circulation amount of the steam, a bypass line that is branched from the main steam line, and that is connected to a downstream side of the steam turbine in a flowing direction of the steam, a bypass valve that is disposed in the bypass line so as to regulate the circulation amount of the steam, and a control unit that causes the fuel regulating valve, the main steam valve, and the bypass valve to perform a bypass closing operation for bringing the main steam valve into an open state, setting an opening degree of the fuel regulating valve to an opening degree according to a target value of a total load of the gas turbine and the steam turbine, and bringing the bypass valve into a closed state, and to perform a decreasing load following operation for bringing the main steam valve into an open state in a case where a load decreasing request to decrease the target value of the total load is input, in the bypass closing operation, decreasing the opening degree of the fuel regulating valve in accordance with the target value, and bringing the bypass valve into a closed state in a case where the total load reaches the target value after the bypass valve is brought into an open state.

Therefore, in a case where the load decreasing request is input, some of the steam flowing from the heat recovery steam generator to the main steam line flows to the bypass line. Accordingly, the supply amount of the steam supplied to the steam turbine decreases. In this case, the load of the steam turbine can be decreased earlier than when the steam generation amount is decreased by the heat recovery steam generator as the load of the gas turbine decreases. In this manner, it is possible to improve followability of the steam turbine following overall load fluctuations.

In the combined cycle plant according to the present invention, the control unit gradually may change the opening degree of the bypass valve in the decreasing load following operation.

Therefore, since the opening degree of the bypass valve is gradually changed, it is possible to prevent the load of the steam turbine from being unstable.

In the combined cycle plant according to the present invention, in the decreasing load following operation, in a case where the load of the steam turbine increases by bringing the bypass valve into the closed state, the control unit may decrease the opening degree of the fuel regulating valve so that the load of the gas turbine decreases in accordance with the increasing load of the steam turbine.

Therefore, it is possible to suppress fluctuations in the total load of the gas turbine and the steam turbine.

The combined cycle plant according to the present invention may further include a condenser that is disposed on the downstream side of the steam turbine in the flowing direction of the steam. The steam turbine and the bypass line may be connected to the condenser.

Therefore, since the steam flowing from the heat recovery steam generator to the bypass line is condensed by the condenser, the steam can be reused as a condensate.

The combined cycle plant according to the present invention may further include a cooling water supply unit that supplies cooling water for cooling the condenser to the condenser. The control unit may have a pump control unit that increases an amount per unit time of the cooling water supplied to the condenser in the decreasing load following operation so as to be more than an amount per unit time of the cooling water supplied to the condenser in the bypass closing operation.

Therefore, since the steam supplied from the bypass line can suppress unnecessary temperature rising of the cooling water in the condenser, it is possible to suppress temperature rising in an outlet temperature of the condenser.

In the combined cycle plant according to the present invention, the cooling water supply unit may have a first supply unit that supplies the cooling water to the condenser in the bypass closing operation and the decreasing load following operation, and a second supply unit that supplies the cooling water to the condenser together with the first supply unit in the decreasing load following operation.

Therefore, since the second supply unit is used in a case of increasing the amount per unit time of the cooling water to be supplied to the condenser, it is possible to easily regulate the supply amount of the cooling water.

In the combined cycle plant according to the present invention, the control unit may cause the fuel regulating valve, the main steam valve, the bypass valve to perform an increasing load following operation for waiting for an input of the load increasing request after bringing the main steam valve into an open state and bringing the bypass valve into an open state, in the bypass closing operation, in a case where a load increasing request to increase the target value of the total load is input, increasing the opening degree of the fuel regulating valve in accordance with the target value after the load increasing request is input, and bringing the bypass valve into a closed state.

Therefore, in a case where the load increasing request is input, some of the steam flowing from the heat recovery steam generator to the main steam line is caused to flow to the bypass line in advance. In the case where the load increasing request is input, the steam caused to flow in the bypass line in advance is caused to flow to the main steam line. Accordingly, it is possible to effectively increase the supply amount of the steam supplied to the steam turbine. In this case, the load of the steam turbine can be increased earlier than when the steam generation amount increases in the heat recovery steam generator as the load of the gas turbine increases. In this manner, it is possible to improve followability of the steam turbine following overall load fluctuations.

In addition, according to the present invention, there is provided a combined cycle plant including a gas turbine that has a compressor which compresses air, a combustor to which fuel is supplied from a fuel supply line so as to combust the air compressed by the compressor, and a turbine which is rotated using combustion gas generated by the combustor, and in which a fuel regulating valve for regulating a fuel supply amount is disposed in the fuel supply line, a heat recovery steam generator that generates steam by recovering heat of exhaust gas discharged from the gas turbine, a steam turbine that is rotated using the steam generated by the heat recovery steam generator, a main steam line that supplies the steam generated by the heat recovery steam generator to the steam turbine, a main steam valve that is disposed in the main steam line so as to regulate a circulation amount of the steam, a bypass line that is branched from the main steam line, and that is connected to a downstream side of the steam turbine in a flowing direction of the steam, a bypass valve that is disposed in the bypass line so as to regulate the circulation amount of the steam, and a control unit that causes the fuel regulating valve, the main steam valve, and the bypass valve to perform a bypass closing operation for bringing the main steam valve into an open state, setting an opening degree of the fuel regulating valve to an opening degree according to a target value of a total load of the gas turbine and the steam turbine, and bringing the bypass valve into a closed state, and to perform an increasing load following operation for waiting for an input of a load increasing request after bringing the main steam valve into a closed state and bringing the bypass valve into an open state, in the bypass closing operation, in a case where the load increasing request to increase the target value of the total load is input, increasing the opening degree of the fuel regulating valve in accordance with the target value after the load increasing request is input, and bringing the bypass valve into a closed state.

Therefore, some of the steam flowing from the heat recovery steam generator to the main steam line is caused to flow to the bypass line in advance. In a case where the load increasing request is input, the steam caused to flow in the bypass line in advance is caused to flow to the main steam line. Accordingly, it is possible to effectively increase the supply amount of the steam supplied to the steam turbine. In this case, the load of the steam turbine can be increased earlier than when the steam generation amount increases in the heat recovery steam generator as the load of the gas turbine increases. In this manner, it is possible to improve followability of the steam turbine following overall load fluctuations.

In the combined cycle plant according to the present invention, the control unit gradually may change the opening degree of the bypass valve in the increasing load following operation.

Therefore, since the opening degree of the bypass valve is gradually changed, it is possible to prevent the load of the steam turbine from being unstable.

In the combined cycle plant according to the present invention, in the increasing load following operation, in a case where the load of the steam turbine decreases by bringing the bypass valve into the open state, the control unit may increase the opening degree of the fuel regulating valve so that the load of the gas turbine increases in accordance with the decreasing load of the steam turbine.

Therefore, it is possible to suppress fluctuations in the total load of the gas turbine and the steam turbine.

The combined cycle plant according to the present invention may further include a condenser that is disposed on the downstream side of the steam turbine in the flowing direction of the steam. The steam turbine and the bypass line may be connected to the condenser.

Therefore, since the steam flowing from the heat recovery steam generator to the bypass line is condensed by the condenser, the steam can be reused as a condensate.

The combined cycle plant according to the present invention may further include a cooling water supply unit that supplies cooling water for cooling the condenser to the condenser. The control unit may have a pump control unit that increases an amount per unit time of the cooling water supplied to the condenser in the increasing load following operation so as to be more than an amount per unit time of the cooling water supplied to the condenser in the bypass closing operation.

Therefore, since the steam supplied from the bypass line can suppress unnecessary temperature rising of the cooling water in the condenser, it is possible to suppress temperature rising in an outlet temperature of the condenser.

In the combined cycle plant according to the present invention, the cooling water supply unit may have a first supply unit that supplies the cooling water to the condenser in the bypass closing operation and the decreasing load following operation, and a second supply unit that supplies the cooling water to the condenser together with the first supply unit in the increasing load following operation.

Therefore, since the second supply unit is used in a case of increasing the amount per unit time of the cooling water to be supplied to the condenser, it is possible to easily regulate the supply amount of the cooling water.

In addition, according to the present invention, there is provided a method for controlling an operation of a combined cycle plant, the combined cycle plant including a gas turbine that has a compressor which compresses air, a combustor to which fuel is supplied from a fuel supply line so as to combust the air compressed by the compressor, and a turbine which is rotated using combustion gas generated by the combustor, and in which a fuel regulating valve for regulating a fuel supply amount is disposed in the fuel supply line, a heat recovery steam generator that generates steam by recovering heat of exhaust gas discharged from the gas turbine, a steam turbine that is rotated using the steam generated by the heat recovery steam generator, a main steam line that supplies the steam generated by the heat recovery steam generator to the steam turbine, a main steam valve that is disposed in the main steam line so as to regulate a circulation amount of the steam, a bypass line that is branched from the main steam line, and that is connected to a downstream side of the steam turbine in a flowing direction of the steam, and a bypass valve that is disposed in the bypass line so as to regulate the circulation amount of the steam. The method includes performing a bypass closing operation for bringing the main steam valve into an open state, setting an opening degree of the fuel regulating valve to an opening degree according to a target value of a total load of the gas turbine and the steam turbine, and bringing the bypass valve into a closed state, and performing a decreasing load following operation for bringing the main steam valve into an open state in a case where a load decreasing request to decrease the target value of the total load is input in the bypass closing operation, decreasing the opening degree of the fuel regulating valve in accordance with the target value, and bringing the bypass valve into a closed state in a case where the total load reaches the target value after the bypass valve is brought into an open state.

Therefore, the load of the steam turbine can be decreased earlier than when the steam generation amount is decreased by the heat recovery steam generator as the load of the gas turbine decreases. In this manner, it is possible to improve followability of the steam turbine following overall load fluctuations.

In addition, according to the present invention, there is provided a method for operating a combined cycle plant, the combined cycle plant including a gas turbine that has a compressor which compresses air, a combustor to which fuel is supplied from a fuel supply line so as to combust the air compressed by the compressor, and a turbine which is rotated using combustion gas generated by the combustor, and in which a fuel regulating valve for regulating a fuel supply amount is disposed in the fuel supply line, a heat recovery steam generator that generates steam by recovering heat of exhaust gas discharged from the gas turbine, a steam turbine that is rotated using the steam generated by the heat recovery steam generator, a main steam line that supplies the steam generated by the heat recovery steam generator to the steam turbine, a main steam valve that is disposed in the main steam line so as to regulate a circulation amount of the steam, a bypass line that is branched from the main steam line, and that is connected to a downstream side of the steam turbine in a flowing direction of the steam, and a bypass valve that is disposed in the bypass line so as to regulate the circulation amount of the steam. The method includes performing a bypass closing operation for bringing the main steam valve into an open state, setting an opening degree of the fuel regulating valve to an opening degree according to a target value of a total load of the gas turbine and the steam turbine, and bringing the bypass valve into a closed state; and performing an increasing load following operation for waiting for an input of a load increasing request after bringing the main steam valve into an open state and bringing the bypass valve into an open state, in the bypass closing operation, in a case where the load increasing request to increase the target value of the total load is input, increasing the opening degree of the fuel regulating valve in accordance with the target value after the load increasing request is input, and bringing the bypass valve into a closed state.

Therefore, the load of the steam turbine can be increased earlier than when the steam generation amount increases in the heat recovery steam generator as the load of the gas turbine increases. In this manner, it is possible to improve followability of the steam turbine following overall load fluctuations.

Advantageous Effects of Invention

According to the present invention, it is possible to provide a combined cycle plant and a method for controlling an operation of a combined cycle plant which can improve followability of a steam turbine following overall load fluctuations.

DESCRIPTION OF EMBODIMENTS

Hereinafter, embodiments of a gas turbine combined cycle (GTCC) power plant according to the present invention will be described with reference to the drawings. The present invention is not limited by the embodiments. In addition, configuration elements in the following embodiments include elements which can be easily replaced by those skilled in the art, or elements which are substantially the same.

First Embodiment

Figure 1:
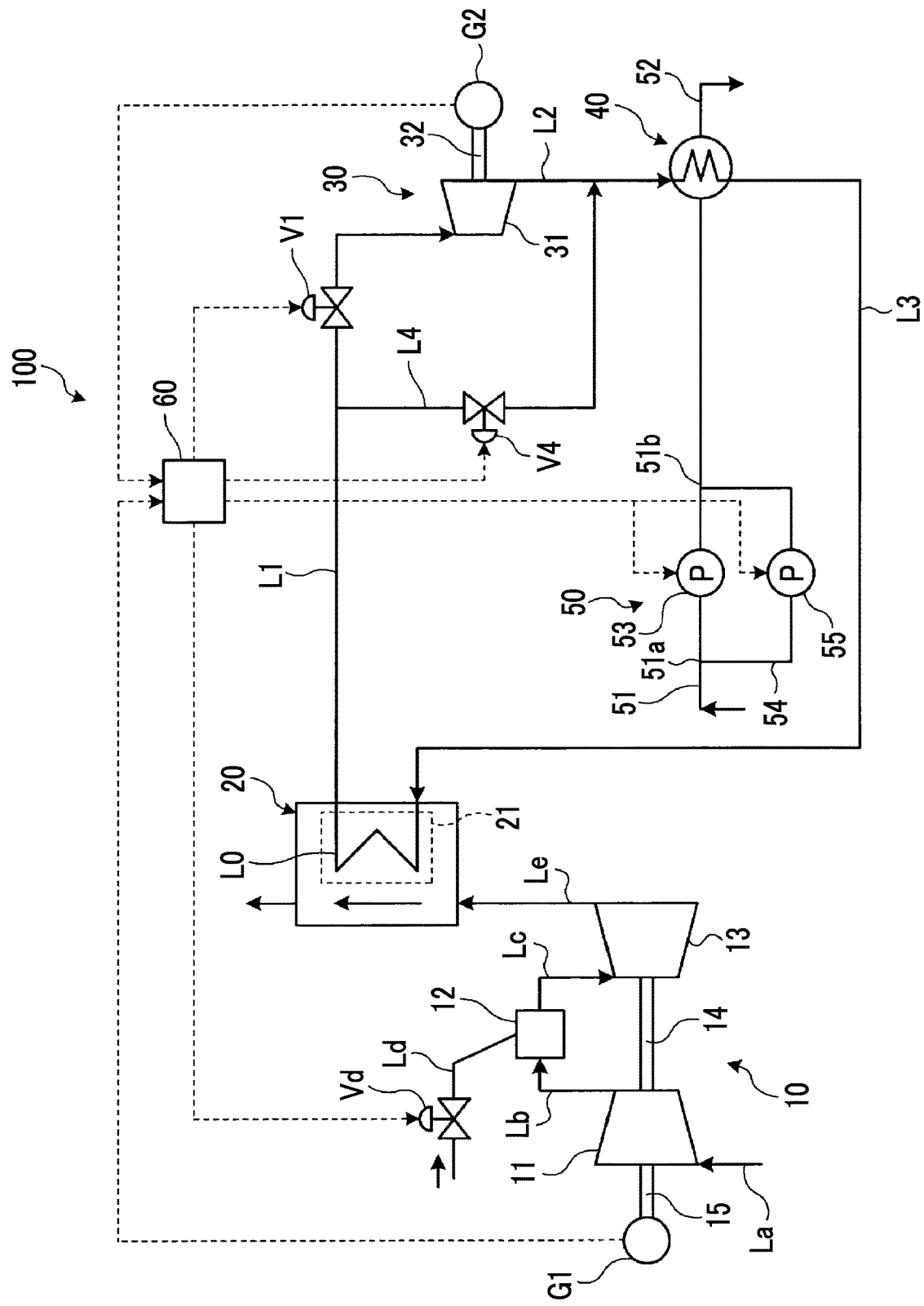
FIG. 1 is a view illustrating an example of a GTCC power plant according to a first embodiment.

FIG. 1 is a view illustrating an example of a GTCC power plant 100 according to a first embodiment. As illustrated in FIG. 1, the GTCC power plant 100 includes a gas turbine 10, a heat recovery steam generator 20, a steam turbine 30, a condenser 40, a cooling water supply unit 50, and a control unit 60.

The gas turbine 10 has a compressor 11, a combustor 12, and a turbine 13. The compressor 11 fetches air from an air introduction line La, and compresses the air into compressed air having high temperature and high pressure.

The combustor 12 supplies fuel to the compressed air supplied from the compressor 11 via a compressed air supply line Lb, and combusts the compressed air with the fuel. A fuel supply line Ld is connected to the combustor 12. The fuel supply line Ld supplies the fuel to the combustor 12. A fuel regulating valve Vd is disposed in the fuel supply line Ld. The fuel regulating valve Vd regulates a fuel supply amount for the combustor 12 by regulating an opening degree. The opening degree of the fuel regulating valve Vd is regulated by the control unit 60.

The turbine 13 is rotated by combustion gas having high temperature and high pressure which is supplied from the combustor 12 via a combustion gas supply line Lc. The turbine 13 is connected to a rotor 14 and a drive shaft 15. The rotor 14 and the drive shaft 15 are rotated by the rotation of the turbine 13. The drive shaft 15 is connected to a generator G1. The generator G1 converts rotational energy of the drive shaft 15 into electric energy, and outputs the electric energy. The generator G1 transmits an output value (load) to the control unit 60. In addition, the turbine 13 discharges the combustion gas (exhaust gas) used for the rotation to an exhaust gas line Le.

The heat recovery steam generator 20 is installed in the exhaust gas line Le, performs heat exchange with the exhaust gas flowing in the exhaust gas line Le, recovers heat of the exhaust gas, and generates steam. The heat recovery steam generator 20 discharges the generated steam to a main steam line L1. The heat recovery steam generator 20 has a heat recovery unit 21. The heat recovery unit 21 is a heat exchanger. A heat medium (steam) flows into a heat transfer tube L0, and the heat recovery unit 21 performs the heat exchange between the exhaust gas flowing outside the heat transfer tube and the heat medium flowing inside the heat transfer tube L0. The heat recovery unit 21 having one heat exchanger is illustrated in FIG. 1. However, the heat recovery unit 21 may include a plurality of heat exchangers such as an economizer, a heater, and a repeater. The heat transfer tube L0 connects a condensate line L3 and the main steam line L1 to each other.

The steam turbine 30 is connected to the main steam line L1. The steam turbine 30 has a turbine 31 and a rotor 32. The turbine 31 is rotated by the steam supplied from the heat recovery steam generator 20 via the main steam line L1. The rotor 32 is rotated by the rotation of the turbine 31. The rotor 32 is connected to a generator G2. The generator G2 converts rotational energy of the rotor 32 into electric energy, and outputs the electric energy. The generator G2 transmits an output value (load) to the control unit 60. The turbine 31 discharges the steam used for the rotation to the discharge line L2.

The main steam line L1 has a main steam valve V1. The main steam valve V1 regulates a flow rate of the steam circulating in the main steam line L1. An opening/closing operation of the main steam valve V1 is controlled by the control unit 60.

In addition, the main steam line L1 has a bypass line L4. The bypass line L4 is branched from the main steam line L1, and is connected to the discharge line L2 on a downstream side of the steam turbine 30 in a flowing direction of the steam. The bypass line L4 supplies at least some of the steam circulating in the main steam line L1 to the discharge line L2 by causing the steam to bypass the steam turbine 30. The bypass line L4 has a bypass valve V4. The bypass valve V4 regulates a flow rate of the steam circulating in the bypass line L4. An opening/closing operation of the bypass valve V4 is controlled by the control unit 60.

The condenser 40 is disposed on the downstream side of the steam turbine 30 in the flowing direction of the steam, and is connected to the discharge line L2, for example. The condenser 40 condenses moisture in the steam supplied from the discharge line L2 so as to generate a condensate. The condenser 40 discharges the generated condensate to the condensate line L3. The condensate line L3 is connected to the above-described heat transfer tube L0. Therefore, the condensate supplied from the condensate line L3 circulates in the heat transfer tube L0.

The cooling water supply unit 50 supplies cooling water to the condenser 40. The cooling water supply unit 50 has a water intake pipe 51 and a drain pipe 52. One end of the water intake pipe 51 is disposed in the sea, and the other end is connected to the condenser 40. The water intake pipe 51 has a first pump 53. The first pump fetches seawater, causes the seawater to circulate in the water intake pipe 51, and supplies the seawater to the condenser 40. One end of the drain pipe 52 is connected to the condenser 40, and the other end is disposed in the sea. The drain pipe 52 causes the cooling water supplied to the condenser 40 and used for cooling to circulate and return to the sea.

In addition, the cooling water supply unit 50 has a branch pipe 54. The branch pipe 54 is branched from a first portion 51a on an upstream side of the first pump 53 in the water intake pipe 51 in the flowing direction of the cooling water. In addition, the branch pipe 54 is connected to a second portion 51b on the downstream side of the first pump 53 in the water intake pipe 51 in the flowing direction of the cooling water. Therefore, the branch pipe 54 is connected to the water intake pipe 51 so as to bypass the first pump 53. The branch pipe 54 has a second pump 55. The second pump 55 fetches the seawater, and causes the seawater to circulate from the water intake pipe 51 through the first portion 51a and the branch pipe 54 to the second portion 51b and the water intake pipe 51, thereby supplying the seawater to the condenser 40.

Figure 2:
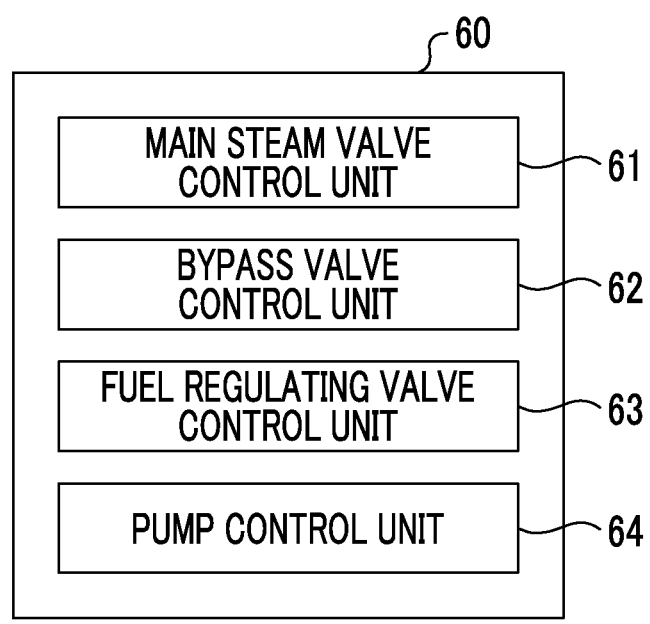
FIG. 2 is a block diagram illustrating an example of a configuration of a control unit according to the first embodiment.

The control unit 60 controls an operation of each unit of the GTCC power plant 100. FIG. 2 is a block diagram illustrating an example of a configuration of the control unit 60. As illustrated in FIG. 2, the control unit 60 has a main steam valve control unit 61, a bypass valve control unit 62, a fuel regulating valve control unit 63, and a pump control unit 64.

The main steam valve control unit 61 controls an opening/closing operation of the main steam valve V1. The bypass valve control unit 62 controls an opening/closing operation of the bypass valve V4. The bypass valve control unit 62 can regulate an opening degree of the bypass valve V4. The fuel regulating valve control unit controls an opening/closing operation of the fuel regulating valve Vd. The fuel regulating valve control unit 63 can regulate an opening degree of the fuel regulating valve Vd. The pump control unit 64 controls each operation of the first pump 53 and the second pump 55.

The pump control unit 64 can separately control each operation of the first pump 53 and the operation of the second pump 55.

Figure 3:
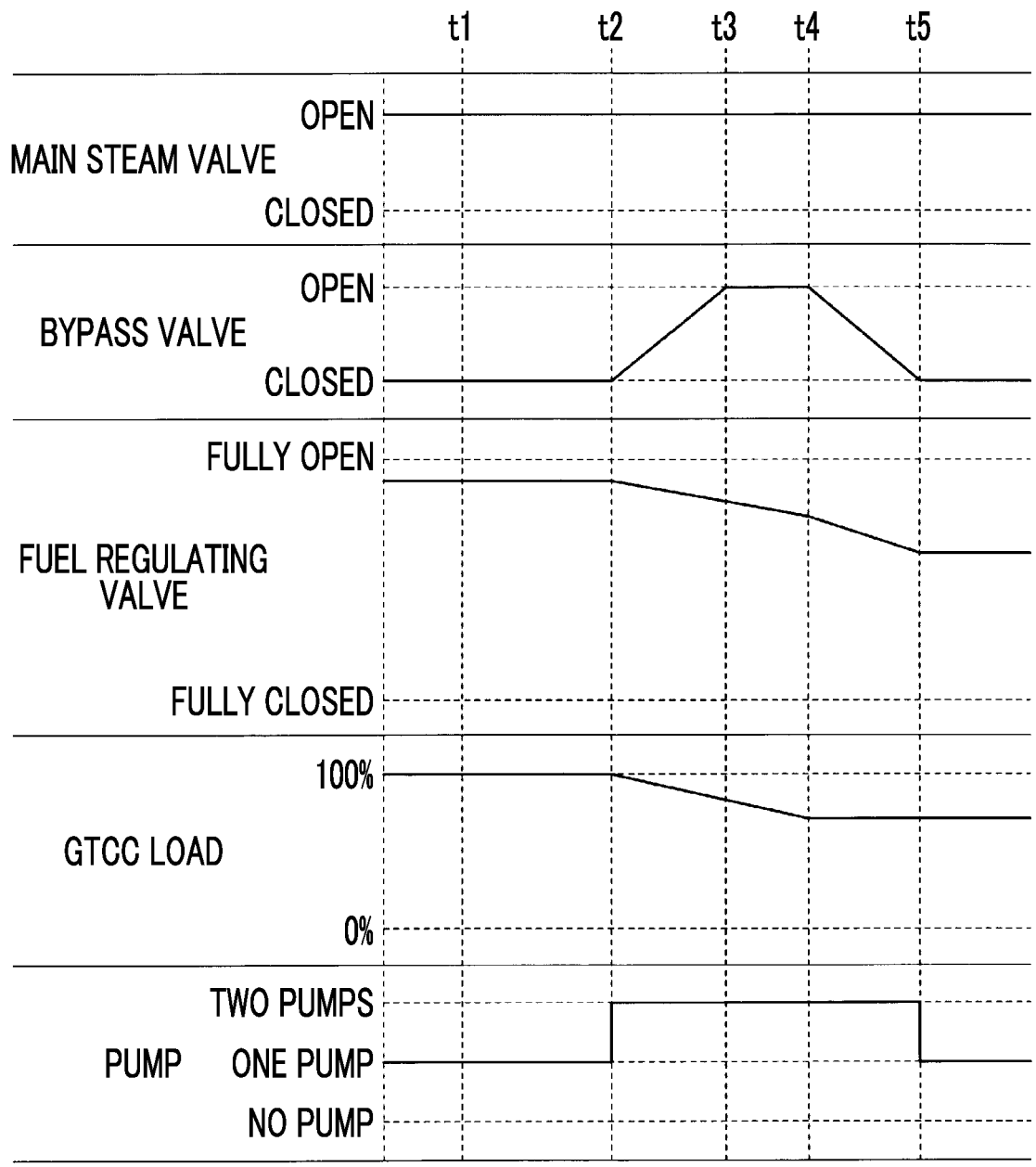
FIG. 3 is a timing chart illustrating an operation of the GTCC power plant according to the first embodiment.
Figure 4:
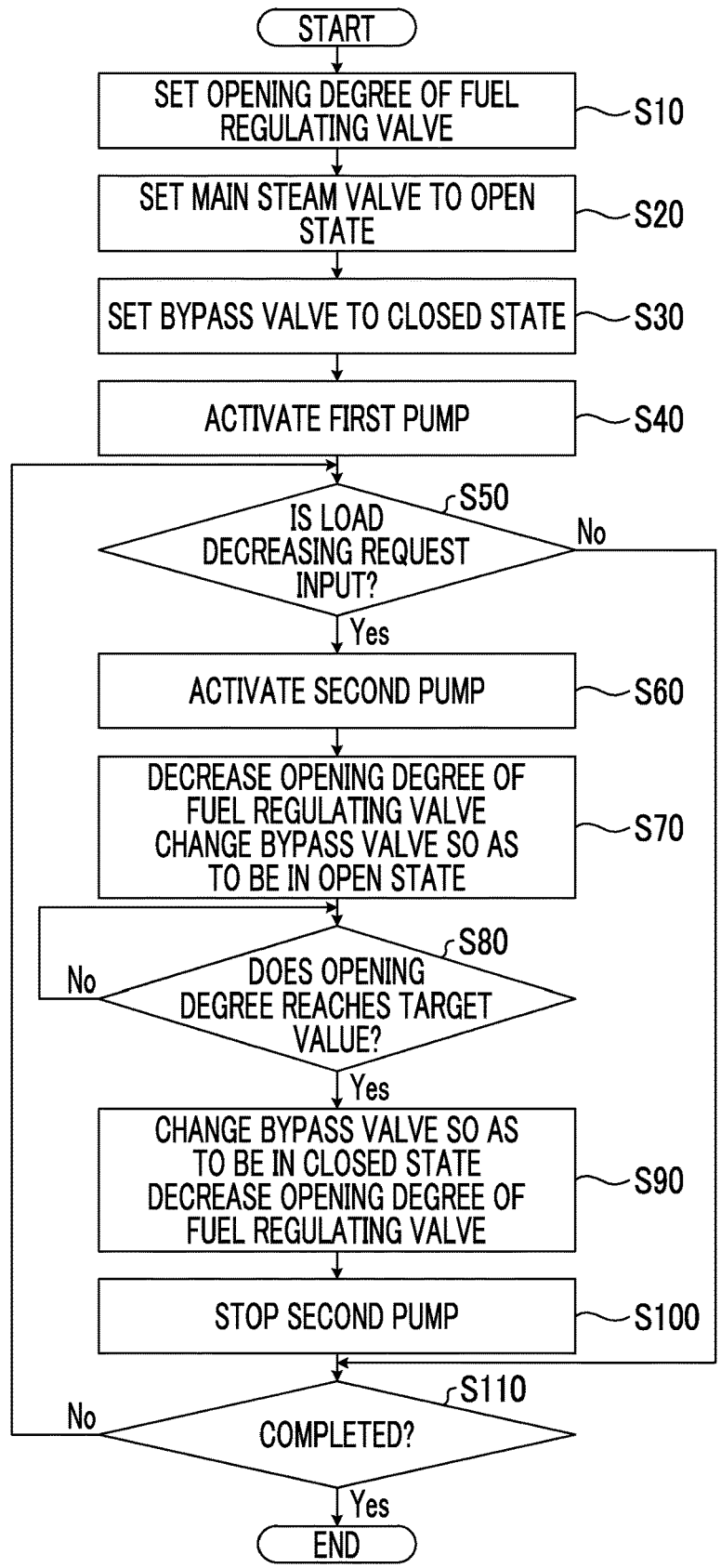
FIG. 4 is a flowchart illustrating an operation of the GTCC power plant according to the first embodiment.

Subsequently, an operation of the GTCC power plant 100 configured as described above will be described. FIG. 3 is a timing chart illustrating the operation of the GTCC power plant 100. A horizontal axis in FIG. 3 illustrates times. FIG. 4 is a flowchart illustrating the operation of the GTCC power plant 100. FIG. 4 is illustrated for sequentially describing the operation of each unit illustrated in FIG. 3. Hereinafter, the operation of the GTCC power plant 100 will be described with reference to FIGS. 3 and 4.

First, the control unit 60 activates the gas turbine 10. In the gas turbine 10, the compressor 11 compresses the air. The compressed air and the fuel are combusted in the combustor 12, and the turbine 13 is rotated using the combustion gas. The generator G1 starts power generation by rotating the turbine 13, and transmits an output value to the control unit 60.

In this operation, the control unit 60 regulates an opening degree of the fuel regulating valve Vd in accordance with a target value (Step S10). For example, in a case where the GTCC power plant 100 performs a constant load operation, the control unit 60 sets a target value of the total load of the gas turbine 10 and the steam turbine 30 (hereinafter, referred to as a "GTCC load") to 100%. Then, the control unit 60 regulates an opening degree of the fuel regulating valve Vd so that the GTCC load is 100%. A relationship between the target value and the opening degree of the fuel regulating valve Vd can be obtained in advance and stored in the control unit 60 as a data table.

In the control unit 60, the main steam valve control unit 61 sets the main steam valve V1 to an open state (Step S20) with a predetermined degree of opening, and the bypass valve control unit 62 sets the bypass valve V4 to a closed state (Step S30). In Step S20 and Step S30, the main steam line L1 is opened, and the bypass line L4 is closed.

In addition, in the control unit 60, the pump control unit 64 activates the first pump 53, and supplies the cooling water to the condenser 40 (Step S40). In this way, in Step S10 to Step S40, the control unit 60 sets the main steam valve V1 to an open state, and sets an opening degree of the fuel regulating valve Vd to an opening degree according to the target value of the GTCC load, thereby performing a bypass closing operation for bringing the bypass valve V4 into a closed state. The control unit 60 may perform all operations in Step S20 to Step S40 at the same time, or may perform at least one operation at a different time.

Figure 5:
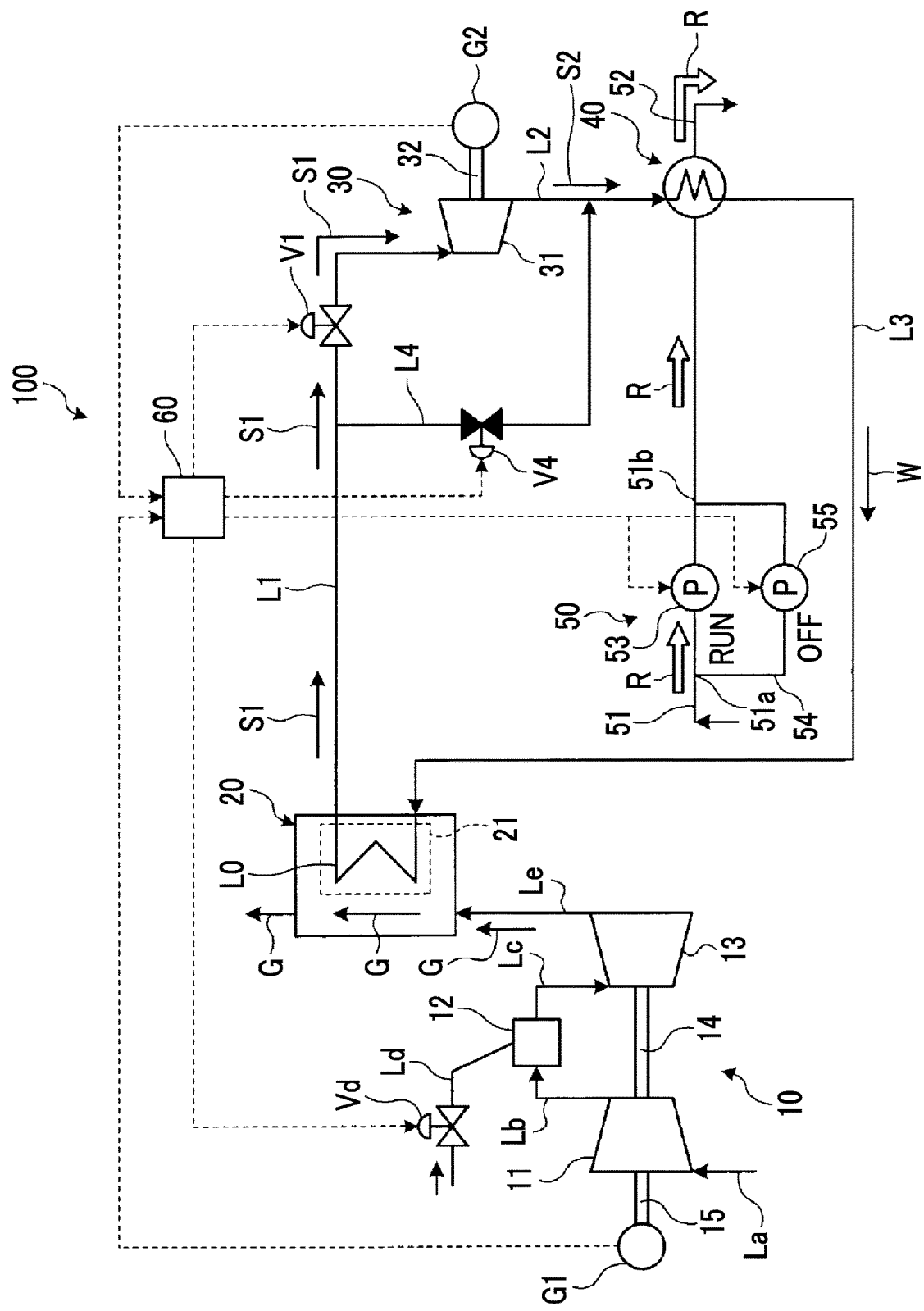
FIG. 5 is a view illustrating an example of the GTCC power plant which performs a bypass closing operation.

In the gas turbine 10, the turbine 13 discharges exhaust gas G to the exhaust gas line Le. The exhaust gas G is supplied to the heat recovery steam generator 20 via the exhaust gas line Le. The heat recovery steam generator 20 absorbs exhaust heat of the exhaust gas G supplied from the exhaust gas line Le, and generates steam S1. FIG. 5 is a view illustrating an example of the GTCC power plant 100 which performs the bypass closing operation. As illustrated in FIG. 5, in the bypass closing operation, the bypass valve V4 is brought into a closed state, and the bypass line L4 is closed. Therefore, the steam S1 generated by the heat recovery steam generator 20 is supplied to the steam turbine 30 via the main steam line L1 without flowing in the bypass line L4.

In the steam turbine 30, the turbine 31 is rotated using the steam S1 supplied from the heat recovery steam generator 20. The generator G2 starts power generation by rotating the turbine 31, and transmits an output value to the control unit 60. The steam turbine 30 discharges steam S2 used for the rotation, and supplies the steam S2 to the condenser 40 via the discharge line L2. The condenser 40 condenses moisture in the supplied steam S2 so as to generate a condensate W, and supplies the condensate W to the heat recovery steam generator 20 via the condensate line L3. The cooling water supply unit 50 cools the condenser 40 by causing the first pump 53 to supply cooling water R to the condenser 40. The cooling water R used in cooling the condenser 40 is discharged into the sea from the drain pipe 52.

In this way, the generator G1 generates power by the operation of the gas turbine 10, and the generator G2 generates power by the operation of the steam turbine 30. In a case where the GTCC load reaches the target value of 100%, the GTCC power plant 100 performs a constant load operation (time t1).

Next, the control unit 60 detects whether or not a load decreasing request for decreasing the target value of the GTCC load from 100% is input (Step S50). The load decreasing request is input in a case where the GTCC load of the GTCC power plant 100 is decreased, for example, such as in a case where a demand drops in a power system.

In a case where the input of the load decreasing request is detected (Yes in Step S50, time t2), the control unit 60 performs a decreasing load following operation so as to cause the GTCC load to follow a new target value set in the load decreasing request. Hereinafter, the decreasing load following operation in a case where the load decreasing request to decrease the target value of the GTCC load to 80% is input will be described in detail as an example.

The pump control unit 64 activates the second pump (Step S60). The second pump 55 is activated, thereby causing the fetched seawater to flow from the water intake pipe 51 to the first portion 51a and the branch pipe 54. The seawater flows through the second portion 51b and the water intake pipe 51 so as to be supplied to the condenser 40. Therefore, the condenser 40 is cooled using the cooling water R supplied by the first pump 53 and the cooling water R supplied by the second pump 55. Therefore, the amount of the cooling water R per unit time for cooling the condenser 40 increases compared to a case where only the first pump 53 is activated. In a case where the bypass valve V4 is in an open state, the steam S1 which does not flow by way of the steam turbine 30 is supplied to the condenser 40. The steam S1 has more thermal energy than the steam S2 which flows by way of the steam turbine 30. The cooling water R is supplied to the condenser 40 by the first pump 53 and the second pump 55. Accordingly, unnecessary temperature rising of the cooling water R in the condenser 40 is suppressed, and temperature rising in an outlet of the condenser 40 is suppressed.

In addition, the fuel regulating valve control unit decreases an opening degree of the fuel regulating valve Vd in accordance with the new target value set in the load decreasing request (Step S70). That is, the fuel regulating valve control unit 63 decreases the opening degree of the fuel regulating valve Vd in order to decrease the fuel supply amount to be supplied to the combustor 12. At this time, the fuel regulating valve control unit 63 controls the opening degree of the fuel regulating valve Vd so that the opening degree gradually decreases with the lapse of time.

Figure 6:
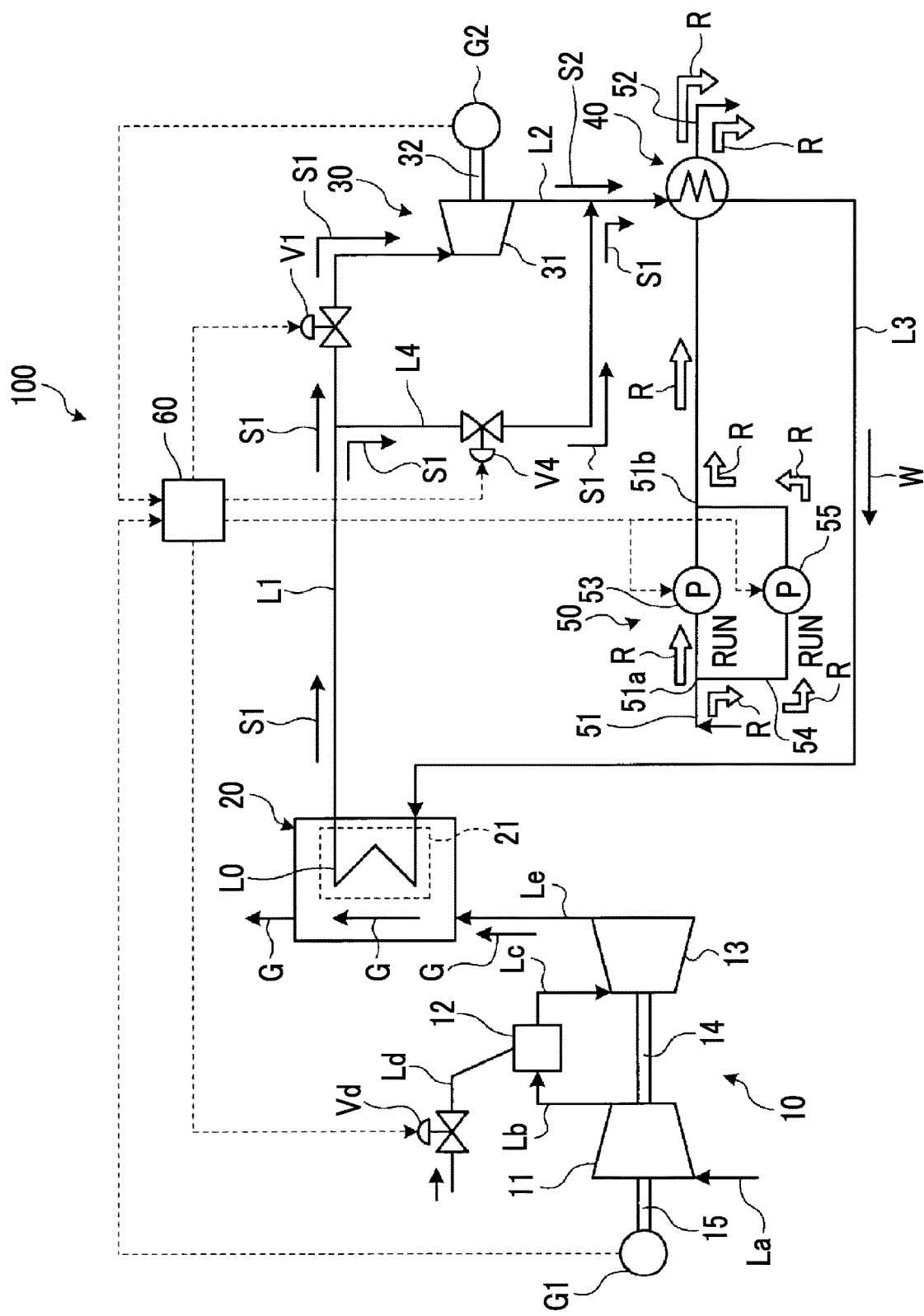
FIG. 6 is a view illustrating an example of the GTCC power plant which performs a decreasing load following operation.

In addition, the bypass valve control unit 62 changes the bypass valve V4 so as to be in an open state (Step S70, time t2 to time t3) while the main steam valve V1 is still in the open state with the predetermined degree of opening (see FIG. 3). In the present embodiment, the operation for causing the bypass valve control unit 62 to change the bypass valve V4 so as to be in the open state is performed in parallel with the operation for causing the above-described fuel regulating valve control unit 63 to decrease the opening degree of the fuel regulating valve Vd. In this regard, both the operations are described in Step S70 in the same manner. However, the present invention is not limited thereto. For example, any one of the operations may be performed earlier. FIG. 6 is a view illustrating an example of the GTCC power plant 100 which performs the decreasing load following operation. As illustrated in FIG. 6, the bypass valve V4 is brought into an open state, thereby opening the bypass line L4 and connecting the main steam line L1 and the discharge line L2 to each other. Therefore, some of the steam S1 flowing in the main steam line L1 is fed to the discharge line L2 via the bypass line L4, and is supplied to the condenser 40.

In Step S70, the bypass valve control unit 62 gradually increases an opening degree of the bypass valve V4 with the lapse of time. For example, as illustrated in FIG. 3, the bypass valve control unit 62 increases the opening degree of the bypass valve V4 at a fixed rate while the main steam valve is still in the open state with the predetermined degree of opening. In addition, for example, at the time (time t3) before the GTCC load reaches the target value, the bypass valve control unit 62 regulates the speed of increasing the opening degree so that the bypass valve V4 is in a fully open state. In a case where the opening degree of the bypass valve V4 is in the fully open state, the bypass valve control unit 62 maintains the opening degree of the bypass valve V4 to be in the fully open state thereafter.

The GTCC power plant 100 changes the bypass valve V4 so as to be in an open state. In this manner, some of the steam S1 flowing from the heat recovery steam generator 20 to the main steam line L1 flows to the bypass line L4. Therefore, the supply amount of the steam S1 supplied to the steam turbine 30 decreases. The time required until the amount of the steam supplied to the steam turbine 30 decreases after the bypass valve V4 is changed so as to be in the open state is faster than the time required until the amount of the steam generated in the heat recovery steam generator 20 decreases as the load of the gas turbine 10 decreases. Therefore, the load of the steam turbine 30 efficiently decreases.

Thereafter, the control unit 60 detects whether or not the GTCC load reaches the target value (Step S80), and continuously performs the above-described operation until the GTCC load reaches the target value (No in Step S80). In a case where it is detected that the GTCC load reaches the target value (Yes in the Step S80, time t4), the bypass valve control unit 62 changes the bypass valve V4 so as to be in a closed state (Step S90).

In this step, the bypass valve control unit 62 gradually decreases an opening degree of the bypass valve V4 with the lapse of time. For example, as illustrated in FIG. 3, the bypass valve control unit 62 decreases the opening degree of the bypass valve V4 at a fixed rate. In a case where the opening degree of the bypass valve V4 in in a fully closed state (time t5), the bypass valve control unit 62 maintains the opening degree of the bypass valve V4 so as to be in fully closed state thereafter.

In addition, in a case of decreasing the opening degree of the bypass valve V4, the steam S1 flowing in the bypass line L4 so far flows through the main steam line L1. Therefore, the amount of the steam S1 supplied to the steam turbine 30 increases, and the load of the steam turbine 30 increases. Therefore, the fuel regulating valve control unit 63 decreases an opening degree of the fuel regulating valve Vd (Step S90). In the present embodiment, the operation for causing the fuel regulating valve control unit 63 to decrease the opening degree of the fuel regulating valve Vd is performed in parallel with the operation for causing the above-described bypass valve control unit 62 to change the bypass valve V4 so as to be in the closed state. In this regard, both the operations are described in Step S90 in the same manner. However, the present invention is not limited thereto. For example, any one of the operations may be performed earlier. In this step, the opening degree of the fuel regulating valve Vd decreases. Accordingly, the load of the gas turbine 10 decreases. The control unit 60 suppresses fluctuations in the GTCC load by decreasing the load of the gas turbine 10 with respect to an increase in the load of the steam turbine 30.

In FIG. 3, a case has been described as an example where the opening degree of the fuel regulating valve Vd is controlled to have a constant value at time t5. In a case of performing this control, the load of the steam turbine 30 which increases when the bypass valve V4 is brought into a closed state is estimated in advance, and the opening degree of the fuel regulating valve Vd according to the estimated value is calculated. Then, the opening degree of the fuel regulating valve Vd may be gradually decreased until the opening degree reaches the calculated value. Controlling the opening degree of the fuel regulating valve Vd is not limited to the above-described aspect. For example, the fuel regulating valve control unit 63 may regulate the opening degree of the fuel regulating valve Vd in accordance with the GTCC load while detecting the load of the gas turbine 10 and the steam turbine 30. In this case, subsequent to time t5, the opening degree of the fuel regulating valve Vd may be continuously regulated.

In addition, if the bypass valve V4 is brought into a fully closed state, the bypass line L4 is closed. Accordingly, the steam Si is not supplied to the condenser 40 from the main steam line L1. Therefore, it is less necessary to supply the cooling water R by using the second pump 55. Therefore, in a case where the bypass valve V4 is brought into the fully closed state, the pump control unit 64 stops the operation of the second pump 55 (Step S100, time t5). After the operation of the second pump 55 is stopped or in a case where the input of the load decreasing request is not detected in Step S50 (No in Step S50), it is detected whether or not an operation completion instruction of the GTCC power plant 100 is input (Step S110). In a case where If the operation completion instruction is detected, the operation is completed (Yes in Step S110). In addition, in a case where the operation completion instruction is not detected (No in Step S110), the operation subsequent to Step S50 is repeatedly performed. In this way, the control unit 60 performs the decreasing load following operation.

As described above, in the GTCC power plant 100 according to the present embodiment, in a case where the load decreasing request is input, in the decreasing load following operation, some of the steam S1 flowing from the heat recovery steam generator 20 to the main steam line L1 are caused to flow to the bypass line L4. Therefore, the supply amount of the steam S1 supplied to the steam turbine 30 decreases. In this manner, it is possible to efficiently decrease the load of the steam turbine 30 so as to satisfy the load decreasing request. Therefore, it is possible to improve load followability of the steam turbine 30.

Figure 7:
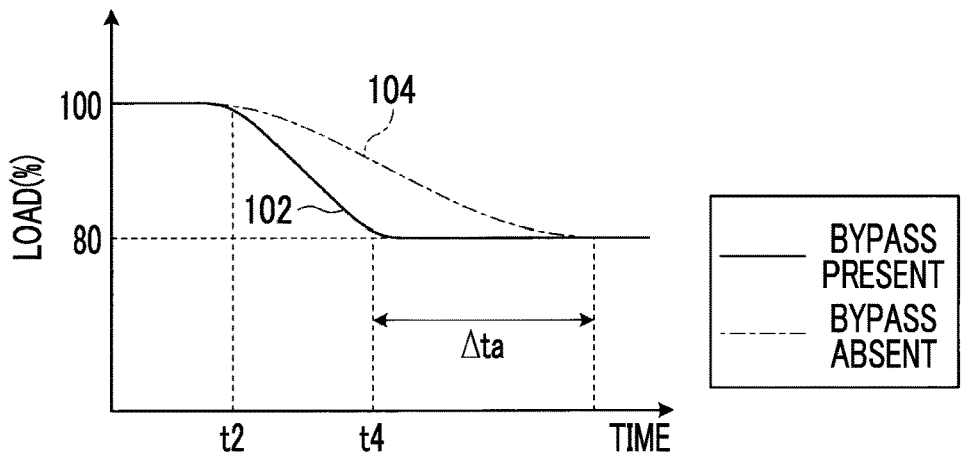
FIG. 7 is a graph schematically illustrating a relationship between times elapsed after a load decreasing request is input and a GTCC load.

FIG. 7 is a graph schematically illustrating a relationship between times elapsed after the load decreasing request is input and the GTCC load. The horizontal axis in FIG. 7 represents the times, and the vertical axis represents values of the GTCC load. In addition, a curve 102 illustrated by a solid line in FIG. 7 represents a relationship in a case where the decreasing load following operation according to the present embodiment is performed. In addition, a curve 104 illustrated by a one-dotted chain line in FIG. 7 represents a relationship in a case where the opening degree of the fuel regulating valve Vd is decreased in a state where the bypass line L4 is closed without performing the decreasing load following operation. Times t2 and t4 on the horizontal axis in FIG. 7 correspond to times t2 and t4 in FIG. 3.

As illustrated in FIG. 7, the GTCC power plant 100 performs the decreasing load following operation so that the time required until the GTCC load reaches the target value is shortened as much as Δta, for example. Therefore, the GTCC power plant 100 can improve followability to follow the GCTT load. The time Δta fluctuates depending on to increasing speed when the opening degree of the bypass valve V4 is increased, or changing speed when the opening degree of the fuel regulating valve Vd is changed.

In addition, according to the present embodiment, in a case where the opening degree of the fuel regulating valve Vd is regulated, the fuel regulating valve control unit 63 gradually decreases the opening degree with the lapse of time. In addition, in a case where the bypass valve V4 is switched between an open state and a closed state, the bypass valve control unit 62 gradually changes the opening degree with the lapse of time. In this manner, sudden fluctuations in the load of the gas turbine 10 and the steam turbine 30 can be suppressed. Therefore, poor power supply quality can be suppressed.

Second Embodiment

Next, a second embodiment will be described. In the second embodiment, an operation in a case where a load increasing request to increase the GTCC load is input when the bypass closing operation is performed in the GTCC power plant 100 will be described. The load increasing request is input in a case of increasing the GTCC load, for example such as a case where an increasing demand is expected in the power system.

Figure 8:
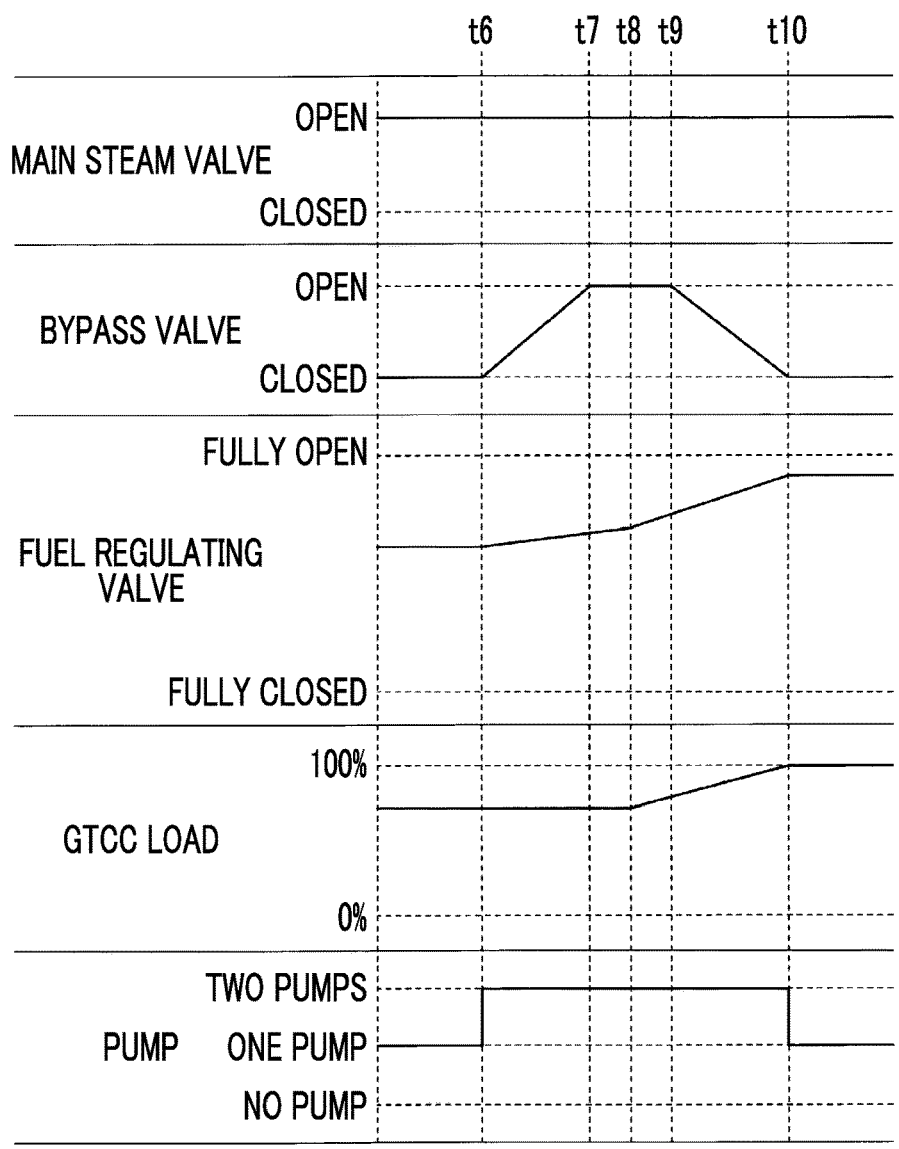
FIG. 8 is a timing chart illustrating an operation of a GTCC power plant according to a second embodiment.
Figure 9:
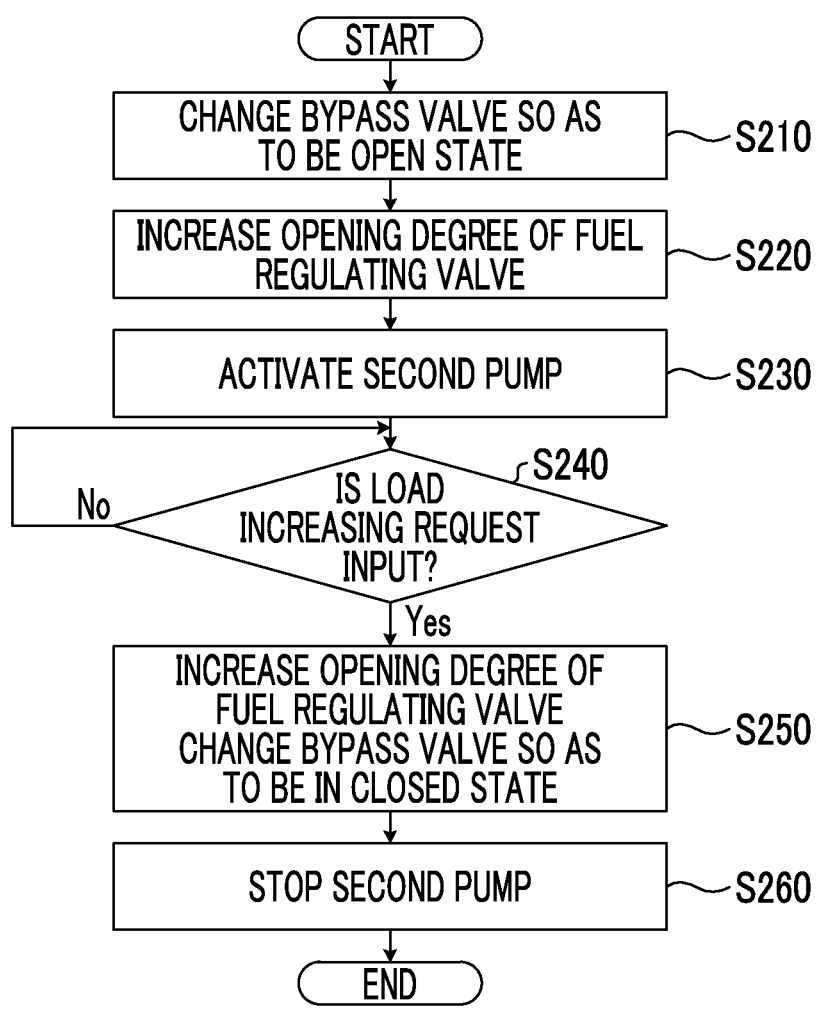
FIG. 9 is a flowchart illustrating an operation of the GTCC power plant according to the second embodiment.

FIG. 8 is a timing chart illustrating an operation of the GTCC power plant 100. The horizontal axis in FIG. 8 represents times. FIG. 9 is a flowchart illustrating the operation of the GTCC power plant 100. FIG. 9 is illustrated for sequentially describing the operation of each unit illustrated in FIG. 8. The operation of the GTCC power plant 100 will be described with reference to FIGS. 8 and 9. In the second embodiment, a case will be described as an example where a scheduled time (for example, time t8 in FIG. 8) to input the load increasing request is identified.

The control unit 60 performs the bypass closing operation for bringing the main steam valve V1 into an open state, setting an opening degree of the fuel regulating valve Vd to an opening degree according to the target value of the GTCC load, and bringing the bypass valve V4 into a closed state. In the second embodiment, for example, the control unit 60 sets the opening degree of the fuel regulating valve Vd so that the GTCC power plant 100 has 80% of the GTCC load. The second embodiment shows a case where the target value of the GTCC load is increased in a state of the bypass closing operation. Accordingly, the target value of the GTCC load in the bypass closing operation may be less than 100%.

In this state, in a case of time t6 which is a predetermined time earlier than time t8 at which the input of the load increasing request is scheduled, the control unit 60 performs the increasing load following operation for causing the GTCC load to follow a new target value set in the load increasing request. The predetermined time (the time from time t6 to time t8) can be set in advance. Hereinafter, the increasing load following operation in a case where the load increasing request to increase the target value of the GTCC load up to 100% is input will be described in detail as an example.

The bypass valve control unit 62 changes the bypass valve V4 so as to be in an open state (Step S210). Since the bypass valve V4 is set to the open state, the bypass line L4 is opened, and the main steam line L1 and the discharge line L2 are connected to each other. Therefore, some of the steam S1 flowing in the main steam line L1 is fed to the discharge line L2 via the bypass line L4, and is supplied to the condenser 40.

In Step S210, the bypass valve control unit 62 gradually increases the opening degree of the bypass valve V4 with the lapse of time. For example, as illustrated in FIG. 8, the bypass valve control unit 62 increases the opening degree of the bypass valve V4 at a fixed rate. In addition, for example, at the time before the load increasing request is input (time t7), the bypass valve control unit 62 regulates speed of increasing the opening degree so that the opening degree of the bypass valve V4 is brought into a fully open state. In a case where the opening degree of the bypass valve V4 is in the fully open state, the bypass valve control unit 62 maintains the opening degree of the bypass valve V4 so as to be in the fully open state thereafter.

In addition, in a case where the bypass valve V4 is opened, some of the steam S1 flowing in the main steam line L1 so far flows to the bypass line L4. Therefore, the amount of the steam S1 supplied to the steam turbine decreases, and the load of the steam turbine 30 decreases. Therefore, the fuel regulating valve control unit 63 regulates the fuel regulating valve Vd so that the opening degree of the fuel regulating valve Vd increases (Step S220). In Step S220, the opening degree of the fuel regulating valve Vd increases. Accordingly, the load of the gas turbine 10 increases. The control unit 60 suppresses fluctuations in the GTCC load by increasing the load of the gas turbine 10 with respect to a decrease in the load of the steam turbine 30.

In FIG. 8, a case has been described as an example where the opening degree of the fuel regulating valve Vd is controlled to increase at a fixed rate. However, the invention is not limited thereto. For example, the fuel regulating valve control unit 63 may regulate the opening degree of the fuel regulating valve Vd depending on the GTCC load while detecting the load of the gas turbine 10 and the steam turbine 30. In this case, the opening degree of the fuel regulating valve Vd may be increased or decreased depending on the GTCC load.

In addition, the pump control unit 64 activates the second pump 55 (Step S230). As the second pump 55 is activated, the fetched seawater flows from the water intake pipe 51 to the first portion 51a and the branch pipe 54, flows to the second portion 51b and the water intake pipe 51, and is supplied to the condenser 40. The cooling water R is supplied to the condenser 40 by the first pump 53 and the second pump 55. Accordingly, unnecessary temperature rising of the cooling water R in the condenser 40 is suppressed, and temperature rising in an outlet of the condenser 40 is suppressed.

In this state, the control unit 60 detects whether or not the load increasing request is input (Step S240), and waits until the load increasing request is input (No in Step S240). In a case where the load increasing request is input (Yes in Step S240), the fuel regulating valve control unit 63 increases the opening degree of the fuel regulating valve Vd according to a new target value set in the load increasing request (Step S250). In this step, the fuel regulating valve control unit 63 controls the opening degree of the fuel regulating valve Vd so that the opening degree gradually increases with the lapse of time.

In addition, the bypass valve control unit 62 maintains the bypass valve V4 so as to be in an open state even after time t8 to input the load increasing request elapses, and changes the bypass valve V4 so as to be a closed state at time t9 after a predetermined time elapses (Step S250). The time to maintain the bypass valve V4 so as to be in the open state after the load increasing request is input, that is, the time from time t8 to time t9 may be set in advance. For example, depending on a value of the GTCC load, the control unit 60 may calculate the time. In the present embodiment, the operation for causing the bypass valve control unit 62 to change the bypass valve V4 so as to be in the closed state is performed in parallel with the operation for causing the above-described the fuel regulating valve control unit 63 to increase the opening degree of the fuel regulating valve Vd. In this regard, both the operations are described in Step S250 in the same manner. However, the present invention is not limited thereto. For example, any one of the operations may be performed earlier. In this step, the bypass valve control unit 62 gradually decreases the opening degree of the bypass valve V4 with the lapse of time. For example, as illustrated in FIG. 8, the bypass valve control unit 62 decreases the opening degree of the bypass valve V4 at a fixed rate. In a case where the opening degree of the bypass valve V4 is in the fully closed state (time t10), the bypass valve control unit 62 maintains the opening degree of the bypass valve V4 so as to be in the fully closed states thereafter.

The GTCC power plant 100 brings the bypass valve V4 into a closed state. In this manner, the flow of the steam S1 is blocked in the bypass line L4, and the steam S1 flows from the heat recovery steam generator 20 to the main steam line L1. Therefore, the supply amount of the steam S1 supplied to the steam turbine 30 increases. The time required until the amount of the steam supplied to the steam turbine 30 increases after the bypass valve V4 is changed so as to be in the closed state is faster than the time required until the steam generation amount increases in the heat recovery steam generator 20 as the load of the gas turbine 10 increases. Therefore, the load of the steam turbine 30 efficiently increases.

In FIG. 8, a case has been described as an example where the time at which the bypass valve V4 is brought into the fully closed state, the time at which the opening degree of the fuel regulating valve Vd is constant, and the time at which the GTCC load reaches the target value (100%) are coincident with each other at time t10. However, the invention is not limited thereto. Any one of the times may be earlier or later than time t10.

In addition, in a case where the bypass valve V4 is in the fully closed state, the pump control unit 64 stops the operation of the second pump 55 (Step S260, time t10). In this way, the control unit 60 performs the increasing load following operation.

As described above, the GTCC power plant 100 according to the present embodiment causes some of the steam S1 flowing from the heat recovery steam generator 20 to the main steam line L1 to flow in the bypass line L4 in advance. In a case where the load increasing request is input, the steam S1 caused to flow in the bypass line L4 in advance is caused to flow to the main steam line L1. Accordingly, the supply amount of the steam S1 supplied to the steam turbine 30 can be efficiently increased. In this case, the load of the steam turbine 30 can be increased earlier than when the steam generation amount increases in the heat recovery steam generator 20 as the load of the gas turbine 10 increases. In this manner, it is possible to improve load followability of the steam turbine 30.

Figure 10:
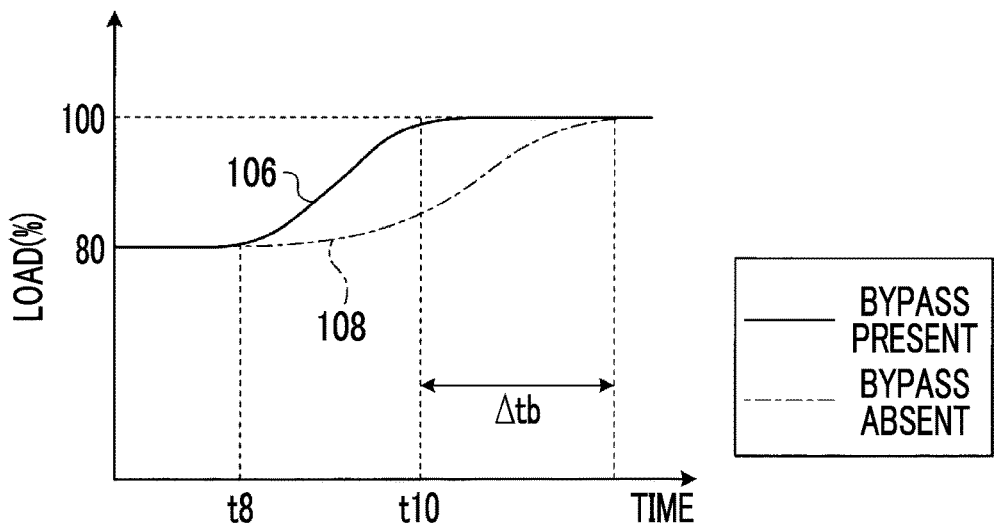
FIG. 10 is a graph schematically illustrating a relationship between times elapsed after a load decreasing request is input and a GTCC load.

FIG. 10 is a graph schematically illustrating a relationship between times elapsed after the load increasing request is input and the GTCC load. The horizontal axis in FIG. 10 represents the times, and the vertical axis represents values of the GTCC load. In addition, a curve 106 illustrated by the solid line in FIG. 10 represents a relationship in a case where the increasing load following operation according to the present embodiment is performed. In addition, a curve 108 illustrated by the one-dotted chain line in FIG. 7 represents a relationship in a case where the opening degree of the fuel regulating valve Vd is increased in a closed state of the bypass line L4 without performing the increasing load following operation is performed. Times t8 and t10 on the horizontal axis in FIG. 10 correspond to times t8 and t10 in FIG. 8.

As illustrated in FIG. 10, the GTCC power plant 100 performs the increasing load following operation so that the time required until the GTCC load reaches the target value is shortened as much as Δtb, for example. Therefore, the GTCC power plant 100 can improve followability to follow the GCTT load. The time Δtb fluctuates depending on to decreasing speed when the opening degree of the bypass valve V4 is decreased, or changing speed when the opening degree of the fuel regulating valve Vd is changed.

The technical scope of the present invention is not limited to the above-described embodiments, and appropriate modifications can be added thereto without departing from the spirit of the present invention. For example, in the above-described embodiments, the operation in a case where the GTCC power plant 100 performs each of the decreasing load following operation and the increasing load following operation has been described as an example. However, the present invention is not limited thereto. A configuration may be adopted in which both the decreasing load following operation and the increasing load following operation can be performed.

Figure 11:
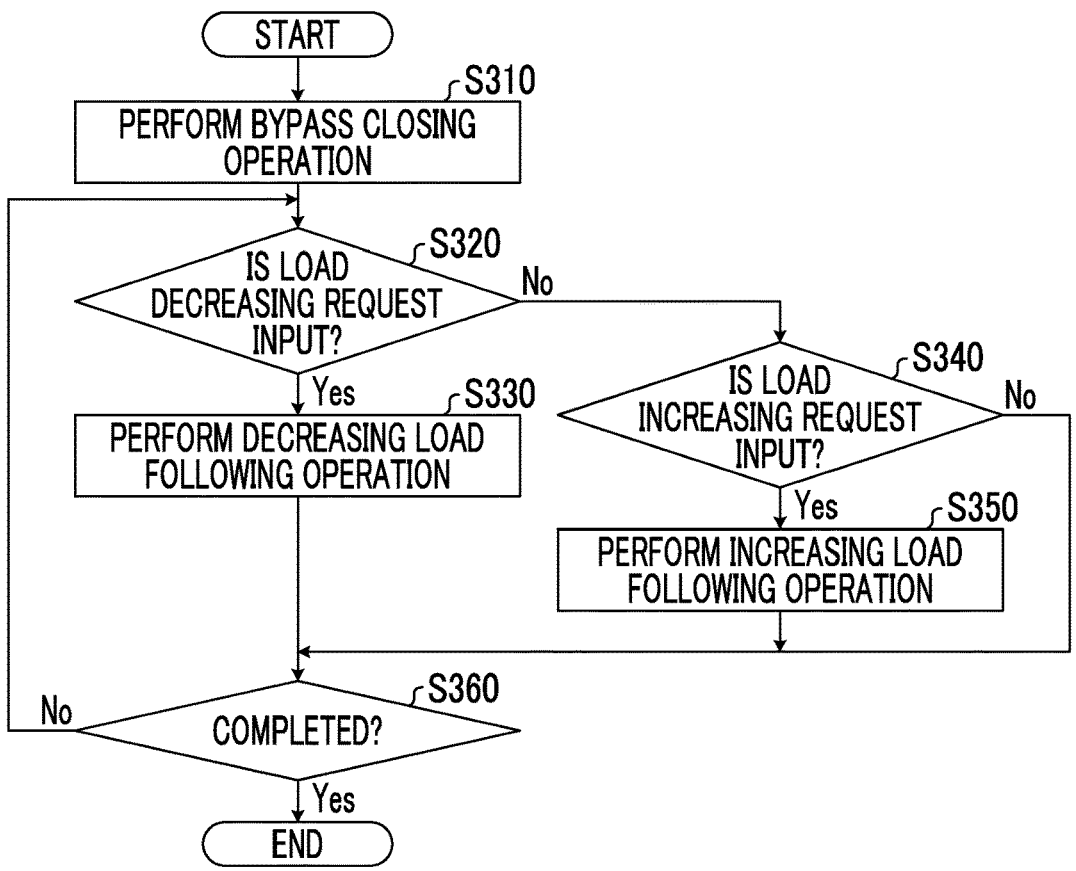
FIG. 11 is a flowchart illustrating an operation of a GTCC power plant according to a modification example.

FIG. 11 is a flowchart illustrating a flow of the operation of the GTCC power plant 100 according to a modification example. Hereinafter, referring to FIG. 11, an operation in a case where the GTCC power plant 100 performs both the decreasing load following operation and the increasing load following operation will be described. As illustrated in FIG. 11, the control unit 60 performs the bypass closing operation for bringing the main steam valve V1 into an open state, setting an opening degree of the fuel regulating valve Vd to an opening degree according to the target value of the GTCC load, and bringing the bypass valve V4 into a closed state (Step S310). In Step S310, as the bypass closing operation, the GTCC power plant 100 performs operations in Step S10 to Step S40 in the first embodiment, for example.

Next, the control unit 60 detects whether or not the load decreasing request for decreasing the target value of the GTCC load is input (Step S320). In a case where the input of the load decreasing request is detected (Yes in Step S320), the control unit 60 performs the decreasing load following operation in order to cause the GTCC load to follow a new target value set in the load decreasing request (Step S330). In Step S330, as the decreasing load following operation, the GTCC power plant 100 performs operations in Step S60 to Step S100 in the first embodiment, for example.

In a case where the input of the load decreasing request is not detected (No in Step S320), the control unit 60 detects whether or not the load increasing request to increase the target value of the GTCC load is scheduled (Step S340). In a case where it is detected that the input of the load increasing request is scheduled (Yes in Step S340), the control unit 60 performs the increasing load following operation in order to cause the GTCC load to follow a new target value in a case where the load increasing request is input (Step S350). In Step S350, as the increasing load following operation, the GTCC power plant 100 performs operations in Step S210 to Step S260 in the second embodiment, for example.

After the decreasing load following operation is performed, after the increasing load following operation is performed, or in a case where it is not detected that the input of the load increasing request is scheduled (No in Step S340), the control unit 60 determines whether or not to complete the operation of the GTCC power plant 100 (Step S360). In a case where it is determined to complete the operation (Yes in Step S360), the control unit 60 completes the operation of the GTCC power plant 100 in accordance with the determination. In a case where it is determined to continue the operation (No in Step S360), the GTCC power plant 100 repeatedly performs operations subsequent to Step S320.

In this manner, the GTCC power plant 100 can efficiently increase or decrease the load of the steam turbine 30 even in a case where any one of the load decreasing request and the load increasing request is input. In this manner, it is possible to improve load followability of the steam turbine.

In the above-described embodiments, the configuration including one steam turbine 30 has been described as an example. However, the present invention is not limited thereto. A configuration may be adopted in which the steam turbines 30 are disposed in multiple stages. In addition, in a case where the steam turbines 30 are disposed at multiple stages, a downstream side end portion of the bypass line L4 may be connected between the steam turbine on the high-pressure side and the steam turbine on the low-pressure side.

In addition, in the above-described embodiments, the case where the control unit 60 changes the opening degree of the bypass valve V4 and the fuel regulating valve Vd at a fixed rate in the decreasing load following operation and the increasing load following operation has been described as an example. However, the present invention is not limited thereto. For example, the control unit 60 may change the opening degree of the bypass valve V4 and the fuel regulating valve Vd in a stepwise manner. In addition, the control unit 60 may gradually increase or decrease a changing rate of the opening degree of the bypass valve V4 and the fuel regulating valve Vd.

In addition, in the above-described embodiment, the following case has been described as an example. In a case where the load of the steam turbine 30 is increased by closing the bypass valve V4 in the decreasing load following operation, the load of the gas turbine 10 is decreased in order to suppress the fluctuations in the GTCC load. However, the present invention is not limited thereto. For example, if the fluctuations in the GTCC load fall within an allowable range, the load of the gas turbine 10 may not be decreased.

Similarly, the following case has been described as an example. In a case where the load of the gas turbine 10 is increased in order to suppress fluctuations in the GTCC load in a case where the load of the steam turbine 30 is decreased by opening the bypass valve V4 in the increasing load following operation. However, as long as the fluctuations in the GTCC load fall within an allowable range, the load of the gas turbine 10 may not be increased.

In addition, in the above-described embodiments, the following case has been described as an example. In the cooling water supply unit 50, the cooling water fetched by the first pump 53 and the second pump 55 merges at the second portion 51b of the water intake pipe 51, and is supplied to the condenser 40. However, the present invention is not limited thereto. For example, a configuration may be adopted in which the cooling water fetched up by the first pump 53 and the cooling water fetched by the second pump 55 are supplied to the condenser 40 via mutually different paths.

REFERENCE SIGNS LIST

G: EXHAUST GAS
G1, G2: GENERATOR
La: AIR INTRODUCTION LINE
Lb: COMPRESSED AIR SUPPLY LINE
Lc: COMBUSTION GAS SUPPLY LINE
Ld: FUEL SUPPLY LINE
Le: EXHAUST GAS LINE
L0: HEAT TRANSFER TUBE
L1: MAIN STEAM LINE
L2: DISCHARGE LINE
L3: CONDENSATE LINE
L4: BYPASS LINE
R: COOLING WATER
S1, S2: STEAM
t1, t2, t3, t4, t5, t6, t7, t8, t9: TIME
Vd: FUEL REGULATING VALVE
V1: MAIN STEAM VALVE
V4: BYPASS VALVE
W: CONDENSATE
10: GAS TURBINE
11: COMPRESSOR
12: COMBUSTOR
13, 31: TURBINE
14, 32: ROTOR
15: DRIVE SHAFT
20: HEAT RECOVERY STEAM GENERATOR
21: HEAT RECOVERY UNIT
30: STEAM TURBINE
40: CONDENSER
50: COOLING WATER SUPPLY UNIT
51: WATER INTAKE PIPE
51a: FIRST PORTION
51b: SECOND PORTION
52: DRAIN PIPE
53: FIRST PUMP
54: BRANCH PIPE
55: SECOND PUMP
60: CONTROL UNIT
61: MAIN STEAM VALVE CONTROL UNIT
62: BYPASS VALVE CONTROL UNIT
63: FUEL REGULATING VALVE CONTROL UNIT
64: PUMP CONTROL UNIT
100: GTCC POWER PLANT
102, 104, 106, 108: CURVE

The invention claimed is:
1. A combined cycle plant comprising:
a gas turbine including a compressor which compresses air, a combustor to which fuel is supplied from a fuel supply line so as to combust the air compressed by the compressor, and a turbine which is rotated using combustion gas generated by the combustor, and in which a fuel regulating valve for regulating a fuel supply amount is disposed in the fuel supply line;

a heat recovery steam generator that generates steam by recovering heat of exhaust gas discharged from the gas turbine;
a steam turbine that is rotated using the steam generated by the heat recovery steam generator;
a main steam line that supplies the steam generated by the heat recovery steam generator to the steam turbine;
a main steam valve that is disposed in the main steam line so as to regulate a circulation amount of the steam;
a bypass line that is branched from the main steam line, and that is connected to a downstream side of the steam turbine in a flowing direction of the steam;
a bypass valve that is disposed in the bypass line so as to regulate the circulation amount of the steam; and
a control unit that controls the fuel regulating valve, the main steam valve, and the bypass valve to:
perform a bypass closing operation for bringing the main steam valve into an open state to have a predetermined degree of opening, setting an opening degree of the fuel regulating valve to an opening degree according to a target value of a total load of the gas turbine and the steam turbine, and bringing the bypass valve into a closed state, and
perform a decreasing load following operation for maintaining the main steam valve in the open state with the predetermined degree of opening while bringing the bypass valve into an open state while the main steam valve is in the open state with the predetermined degree of opening in a case where a load decreasing request to decrease the target value of the total load is input, in the bypass closing operation, decreasing the opening degree of the fuel regulating valve in accordance with the target value, and bringing the bypass valve into a closed state while the main steam valve is in the open state with the predetermined degree of opening in a case where the total load reaches the target value after the bypass valve is brought into the open state.

2. The combined cycle plant according to claim 1, wherein the control unit gradually changes the opening degree of the bypass valve in the decreasing load following operation.

3. The combined cycle plant according to claim 1, wherein in the decreasing load following operation, in a case where the load of the steam turbine increases by bringing the bypass valve into the closed state, the control unit decreases the opening degree of the fuel regulating valve so that the load of the gas turbine decreases in accordance with the increasing load of the steam turbine.

4. The combined cycle plant according to claim 1, further comprising:
a condenser that is disposed on the downstream side of the steam turbine in the flowing direction of the steam,
wherein the steam turbine and the bypass line are connected to the condenser.

5. The combined cycle plant according to claim 4, further comprising:
a cooling water supply unit that supplies cooling water for cooling the condenser to the condenser,
wherein the control unit has a pump control unit that increases an amount per unit time of the cooling water supplied to the condenser in the decreasing load following operation so as to be more than an amount per unit time of the cooling water supplied to the condenser in the bypass closing operation.

6. The combined cycle plant according to claim 5, wherein the cooling water supply unit has a first supply unit that supplies the cooling water to the condenser in the bypass closing operation and the decreasing load following operation, and a second supply unit that supplies the cooling water to the condenser together with the first supply unit in the decreasing load following operation.

7. The combined cycle plant according to claim 1, wherein the control unit causes the fuel regulating valve, the main steam valve, the bypass valve to perform an increasing load following operation for waiting for an input of the load increasing request after bringing the main steam valve into an open state and bringing the bypass valve into an open state, in the bypass closing operation, in a case where a load increasing request to increase the target value of the total load is input, increasing the opening degree of the fuel regulating valve in accordance with the target value after the load increasing request is input, and bringing the bypass valve into a closed state.

8. A combined cycle plant comprising:
a gas turbine that has a compressor which compresses air, a combustor to which fuel is supplied from a fuel supply line so as to combust the air compressed by the compressor, and a turbine which is rotated using combustion gas generated by the combustor, and in which a fuel regulating valve for regulating a fuel supply amount is disposed in the fuel supply line;
a heat recovery steam generator that generates steam by recovering heat of exhaust gas discharged from the gas turbine;
a steam turbine that is rotated using the steam generated by the heat recovery steam generator;
a main steam line that supplies the steam generated by the heat recovery steam generator to the steam turbine;
a main steam valve that is disposed in the main steam line so as to regulate a circulation amount of the steam;
a bypass line that is branched from the main steam line, and that is connected to a downstream side of the steam turbine in a flowing direction of the steam;
a bypass valve that is disposed in the bypass line so as to regulate the circulation amount of the steam; and
a control unit that controls the fuel regulating valve, the main steam valve, and the bypass valve to:
perform a bypass closing operation for bringing the main steam valve into an open state, setting an opening degree of the fuel regulating valve to an opening degree according to a target value of a total load of the gas turbine and the steam turbine, and bringing the bypass valve into a closed state, and to
perform an increasing load following operation for waiting for an input of a load increasing request after bringing the main steam valve into an open state and bringing the bypass valve into an open state, in the bypass closing operation, in a case where the load increasing request to increase the target value of the total load is input, increasing the opening degree of the fuel regulating valve in accordance with the target value after the load increasing request is input, and bringing the bypass valve into a closed state.

9. The combined cycle plant according to claim 8, wherein the control unit gradually changes the opening degree of the bypass valve in the increasing load following operation.

10. The combined cycle plant according to claim 8,
wherein in the increasing load following operation, in a case where the load of the steam turbine decreases by bringing the bypass valve into the open state, the control unit increases the opening degree of the fuel regulating valve so that the load of the gas turbine increases in accordance with the decreasing load of the steam turbine.

11. The combined cycle plant according to claim 8, further comprising:
a condenser that is disposed on the downstream side of the steam turbine in the flowing direction of the steam,
wherein the steam turbine and the bypass line are connected to the condenser.

12. The combined cycle plant according to claim 11, further comprising:
a cooling water supply unit that supplies cooling water for cooling the condenser to the condenser,
wherein the control unit has a pump control unit that increases an amount per unit time of the cooling water supplied to the condenser in the increasing load following operation so as to be more than an amount per unit time of the cooling water supplied to the condenser in the bypass closing operation.

13. The combined cycle plant according to claim 12,
wherein the cooling water supply unit has a first supply unit that supplies the cooling water to the condenser in the bypass closing operation and the decreasing load following operation, and a second supply unit that supplies the cooling water to the condenser together with the first supply unit in the increasing load following operation.

14. A method for controlling an operation of a combined cycle plant, the combined cycle plant including
a gas turbine that has a compressor which compresses air, a combustor to which fuel is supplied from a fuel supply line so as to combust the air compressed by the compressor, and a turbine which is rotated using combustion gas generated by the combustor, and in which a fuel regulating valve for regulating a fuel supply amount is disposed in the fuel supply line,
a heat recovery steam generator that generates steam by recovering heat of exhaust gas discharged from the gas turbine,
a steam turbine that is rotated using the steam generated by the heat recovery steam generator,
a main steam line that supplies the steam generated by the heat recovery steam generator to the steam turbine,
a main steam valve that is disposed in the main steam line so as to regulate a circulation amount of the steam,
a bypass line that is branched from the main steam line, and that is connected to a downstream side of the steam turbine in a flowing direction of the steam, and
a bypass valve that is disposed in the bypass line so as to regulate the circulation amount of the steam,
the method comprising:
performing a bypass closing operation for bringing the main steam valve into an open state to have a predetermined degree of opening, setting an opening degree of the fuel regulating valve to an opening degree according to a target value of a total load of the gas turbine and the steam turbine, and bringing the bypass valve into a closed state; and
performing a decreasing load following operation for maintaining the main steam valve in the open state with the predetermined degree of opening while bringing the bypass valve into an open state while the main steam valve is in the open state with the predetermined degree of opening in a case where a load decreasing request to decrease the target value of the total load is input in the bypass closing operation, decreasing the opening degree of the fuel regulating valve in accordance with the target value, and bringing the bypass valve into a closed state while the main steam valve is in the open state with the predetermined degree of opening in a case where the total load reaches the target value after the bypass valve is brought into the open state.

15. A method for controlling an operation of a combined cycle plant, the combined cycle plant including
a gas turbine that has a compressor which compresses air, a combustor to which fuel is supplied from a fuel supply line so as to combust the air compressed by the compressor, and a turbine which is rotated using combustion gas generated by the combustor, and in which a fuel regulating valve for regulating a fuel supply amount is disposed in the fuel supply line,
a heat recovery steam generator that generates steam by recovering heat of exhaust gas discharged from the gas turbine,
a steam turbine that is rotated using the steam generated by the heat recovery steam generator,
a main steam line that supplies the steam generated by the heat recovery steam generator to the steam turbine,
a main steam valve that is disposed in the main steam line so as to regulate a circulation amount of the steam,
a bypass line that is branched from the main steam line, and that is connected to a downstream side of the steam turbine in a flowing direction of the steam, and
a bypass valve that is disposed in the bypass line so as to regulate the circulation amount of the steam,
the method comprising:
performing a bypass closing operation for bringing the main steam valve into an open state, setting an opening degree of the fuel regulating valve to an opening degree according to a target value of a total load of the gas turbine and the steam turbine, and bringing the bypass valve into a closed state; and
performing an increasing load following operation for waiting for an input of a load increasing request after bringing the main steam valve into an open state and bringing the bypass valve into an open state, in the bypass closing operation, in a case where the load increasing request to increase the target value of the total load is input, increasing the opening degree of the fuel regulating valve in accordance with the target value after the load increasing request is input, and bringing the bypass valve into a closed state.

* * * * *